W. W. PEARCE.
AIR TESTER FOR AIR BRAKE SYSTEMS.
APPLICATION FILED JUNE 23, 1916.
1,216,723.
Patented Feb. 20, 1917.
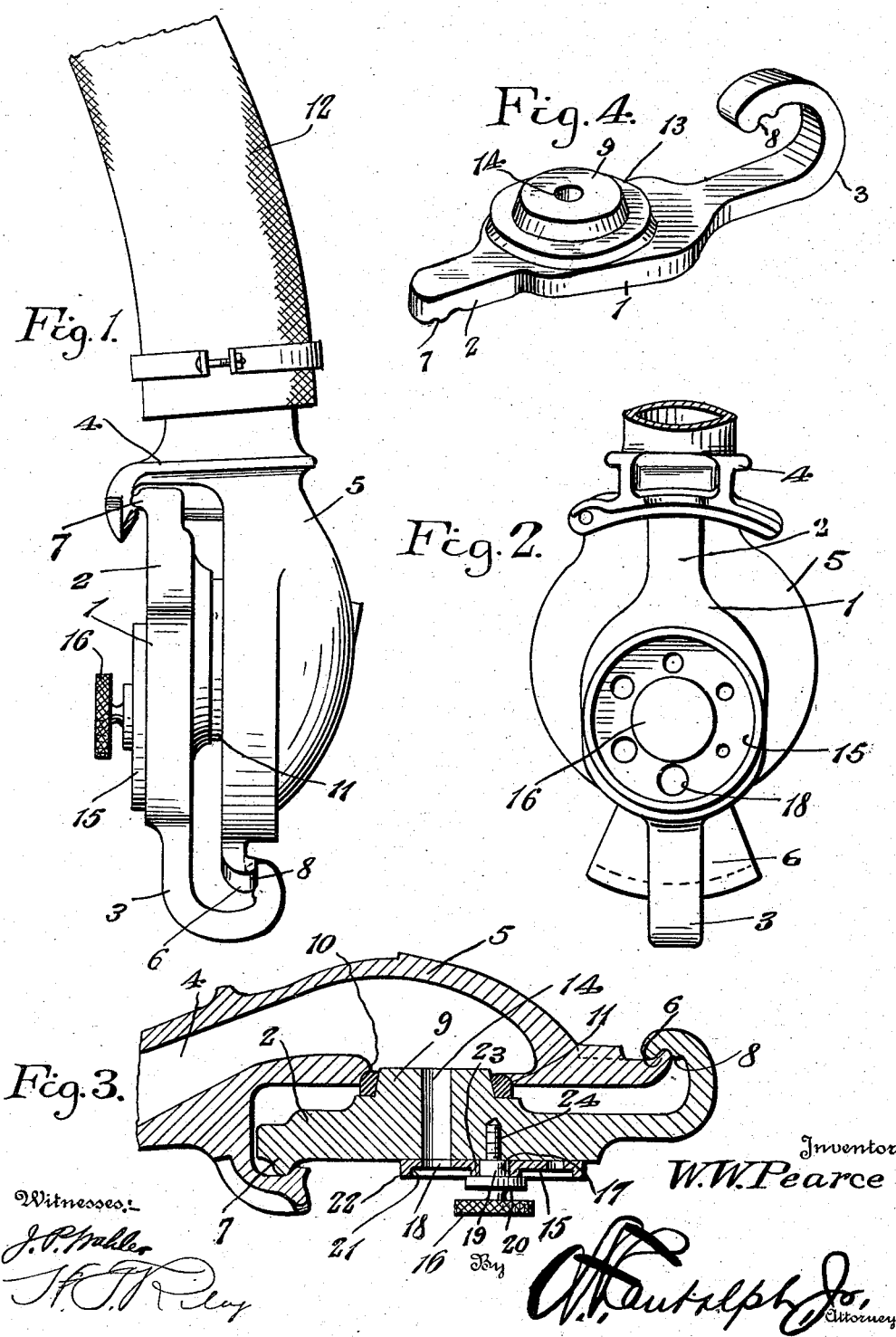

UNITED STATES PATENT OFFICE.

WILLIAM W. PEARCE, OF BIRMINGHAM, ALABAMA.

AIR-TESTER FOR AIR-BRAKE SYSTEMS.

1,216,723.  Specification of Letters Patent.  Patented Feb. 20, 1917.

Application filed June 23, 1916. Serial No. 105,467.

*To all whom it may concern:*

Be it known that I, WILLIAM W. PEARCE, a citizen of the United States, residing at Birmingham, in the county of Jefferson and State of Alabama, have invented certain new and useful Improvements in Air-Testers for Air-Brake Systems; and I do hereby declare the following to be a full, clear, and exact description of the invention, such as will enable others skilled in the art to which it appertains to make and use the same.

The invention relates to an air testing device for air brake systems.

The object of the present invention is to provide a simple, practical and comparatively inexpensive air testing device adapted to be readily applied to the coupler head of the air brake hose back of the tank on the tender or other desired point and equipped with a rotary diaphragm or member provided with a plurality of orifices of various sizes designed to correspond with legal requirements for making air tests and capable of enabling the air compressors of an air brake system to be easily and quickly tested in accordance with the requirements.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing

Figure 1 is a side elevation of an air testing device constructed in accordance with this invention and shown applied to a train line hose, Fig. 2 is a front elevation of the same, Fig. 3 is a longitudinal sectional view through the coupling head and the air testing device, Fig. 4 is a detail perspective view of the body of the device.

Like numerals of reference designate corresponding parts in the several figures of the drawing.

In the accompanying drawing in which is illustrated the preferred embodiment of the invention, the air testing device comprises in its construction a substantially flat body consisting of a heavy plate provided at its inner end with a longitudinal arm 2 and having at its outer end a curved substantially hook shaped arm 3. The arm 2 which is substantially straight is adapted to engage the relatively fixed jaw or inner engaging portion 4 of an air brake coupling head 5 of the ordinary construction and the curved or hook shaped arm 3 is adapted to engage around the outer flange or engaging portion 6 of the air brake coupler head. The arms are provided at their engaging portions with beveled faces 7 and 8 to coact with the beveled cam faces of the air brake coupler head whereby the testing device is adapted to interlock with the engaging portions of the air brake coupler head similar to a coacting or companion coupler head.

The plate or body is provided with a tapered annular enlargement or nipple 9 which is adapted to fit in the lateral orifice or opening 10 of the coupler head and engage the rubber gasket 11. The tapered nipple which projects from one of the faces of the flat body of the device fits in the lateral opening of the coupler head and the device is adapted to be turned similar to the coacting coupler head to engage the coupler head 5. In this manner the testing device may be readily applied to the hose 12 of the tender not shown back of the tank where the tests are made. The body 1 is provided at the base of the nipple with an annular boss 13 which fits against the face of the gasket 11 as clearly illustrated in Fig. 3 of the drawing.

The body is provided with an opening 14 communicating with and extending from the lateral opening of the coupler head and mounted upon the outer face of the body is a rotary diaphragm or member 15 secured to the body by a screw 16 or other suitable fastening device and provided with a central opening 17 for the said screw and a plurality of eccentrically arranged orifices 18 of different sizes arranged to be brought into register with the opening 14 by a rotary movement of the diaphragm or member 15. The screw is provided with a smooth bearing portion 19 to receive the rotary diaphragm or member and it is also provided with a flange 20 for engaging the said diaphragm or member at the central portion thereof. The diaphragm or member is preferably recessed as shown at 21 forming an outer flange 22 and an inner boss 23.

The screw which forms a pivot for the disk or member 15 also enables the same to be securely clamped in its adjustment by the flange engaging the central boss of the disk or member. The tests are made by bringing the different apertures or orifices at the opening 14 and the condition and capacity of the compressor for work and the various other requirements of a test may be ascertained and the testing device may be quickly changed from one locomotive to another. The screw engages a threaded socket or opening formed in the body at the outer side of the opening 14. This arranges the disk or member and the screw in convenient position for ready adjustment.

What is claimed is:—

1. An air testing device for air brake systems including a body provided at one end with an arm and having a hook at its other end to coact with the engaging portions of an ordinary air brake coupler head, said body being provided with a nipple to extend into the lateral opening of a coupler head, and having an opening extending through the nipple and communicating with the coupler head, and a movable member mounted on the said body and provided with a plurality of orifices of different sizes adapted to be brought into communication with the opening of the said body.

2. A testing device for air brake systems including a body having a circular nipple or enlargement adapted to fit in the lateral opening of an air brake coupler head and provided with an opening to communicate with the same, said body being provided at opposite ends with means for engaging and interlocking it with the air brake coupler head, a rotary diaphragm or member provided with a plurality of orifices of different sizes adapted to be brought into register or communication with the opening of the body and means for pivoting the diaphragm or member and for securing the same in its adjustment.

3. An air testing device for air brake systems including a body provided at one of its faces with an annular boss and having a tapered nipple projecting from the boss, said body being also provided with an opening at the nipple and having an inner substantially straight longitudinal arm and provided at the outer end with a hook shaped arm, a disk provided with a central opening and having a plurality of eccentric orifices of different sizes adapted to be carried into register with the opening of the body by a rotary movement of the disk and a screw passing through the central opening of the disk and threaded into the body and provided with a bearing portion for the disk and means for exteriorly engaging the latter.

In testimony whereof I affix my signature in presence of two witnesses.

WILLIAM W. PEARCE.

Witnesses:
FRANK SCHUTZLER,
J. J. FOSTER.

Copies of this patent may be obtained for five cents each, by addressing the "Commissioner of Patents Washington, D. C."